US012614909B2

(12) United States Patent
Neuman et al.

(10) Patent No.: US 12,614,909 B2
(45) Date of Patent: Apr. 28, 2026

(54) PREEMPTIVE CHARGING FOR POWER OUTAGE MITIGATION

(71) Applicant: GM GLOBAL TECHNOLOGY OPERATIONS LLC, Detroit, MI (US)

(72) Inventors: Christopher R. Neuman, Denver, CO (US); Ciro A. Spigno, Jr., Leonard, MI (US); James C. Gibbs, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 673 days.

(21) Appl. No.: 18/188,631

(22) Filed: Mar. 23, 2023

(65) Prior Publication Data

US 2024/0322570 A1     Sep. 26, 2024

(51) Int. Cl.
| | |
|---|---|
| *H02J 3/32* | (2026.01) |
| *B60L 53/63* | (2019.01) |
| *B60L 55/00* | (2019.01) |
| *H02J 3/00* | (2026.01) |
| *H02J 7/82* | (2026.01) |

(52) U.S. Cl.
CPC ............. *H02J 3/322* (2020.01); *B60L 53/63* (2019.02); *B60L 55/00* (2019.02); *H02J 3/003* (2020.01); *H02J 7/82* (2026.01); *B60L 2240/72* (2013.01)

(58) Field of Classification Search
CPC .... H02J 3/322; H02J 3/003; H02J 7/82; H02J 2103/30; H02J 3/004; H02J 3/28; H02J 7/933; H02J 2105/37; B60L 53/63; B60L 55/00; B60L 2240/72; B60L 53/53; B60L 53/62

USPC ......................................................... 320/109
See application file for complete search history.

(56) References Cited

U.S. PATENT DOCUMENTS

| | | | | |
|---|---|---|---|---|
| 5,923,148 | A * | 7/1999 | Sideris | G01R 31/3648 |
| | | | | 324/429 |
| 7,908,495 | B2 * | 3/2011 | Diab | H04L 12/10 |
| | | | | 713/320 |
| 8,526,320 | B2 * | 9/2013 | Puthenpura | H04W 28/0808 |
| | | | | 709/224 |
| 9,860,965 | B2 * | 1/2018 | Recker | H02J 9/02 |
| 10,432,017 | B1 * | 10/2019 | Morales | H02J 9/062 |
| 10,759,281 | B2 * | 9/2020 | Miller | H02J 7/1438 |
| 11,524,601 | B2 | 12/2022 | Yu et al. | |
| 12,046,906 | B1 * | 7/2024 | Laskowsky | H02J 3/322 |
| 12,139,034 | B2 * | 11/2024 | Diamond | B60L 53/68 |
| 2016/0322835 | A1 * | 11/2016 | Carlson | G05F 1/67 |
| 2019/0056451 | A1 * | 2/2019 | Asghari | H02J 3/32 |
| 2020/0176986 | A1 * | 6/2020 | Addepalle | H02J 3/28 |

(Continued)

*Primary Examiner* — M Baye Diao
(74) *Attorney, Agent, or Firm* — Quinn IP Law

(57) ABSTRACT

Preemptively charging rechargeable energy storage systems (RESSs) in advance of an electrical grid outage. The preemptive charging may include generating a weather map of a geographical area anticipated to be impacted with a storm or a natural event of a severity predicted to induce a power outage, which may include generating a distribution map of an electrical power distribution network within the geographical area, generating an outage map by overlaying the weather map relative to the distribution map to identify one or more intersections where the power outage is predicted, and scheduling or otherwise implementing preemptively charging of one or more the RESSs downstream of the intersections in advance of the power outage.

20 Claims, 3 Drawing Sheets

(56)         References Cited

U.S. PATENT DOCUMENTS

2022/0348106  A1 *  11/2022  Sujan ...................... B60L 53/63
2023/0094216  A1 *   3/2023  Diamond ............. B60L 53/665
                                                        700/291

* cited by examiner

PREEMPTIVE CHARGING FOR POWER OUTAGE MITIGATION

INTRODUCTION

The present disclosure relates to preemptively charging rechargeable energy storage systems (RESSs) in advance of a power outage to an electrical power grid, such as but not necessarily limited to preemptively charging the RESSs with electrical power from the electrical grid in advance of a storm or a natural disaster.

A RESS may include batteries, capacitors, and other electrical storage elements configured for rechargeably storing and supplying electrical power. A stationary storage module may be one type of RESS commonly employed at a dwelling, building, or other usage location. A stationary storage module may be used to meter electrical power distribution between the usage location and an electrical grid of an electrical utility, such as by selectively storing electric power for and supplying electrical power to the usage location and/or the electrical grid. The use of stationary storage modules may become more prevalent with the beneficial capabilities of the stationary storage modules to consume electrical power from the electrical grid during non-peak or lower cost usage times and thereafter store the lower cost electrical power for subsequent supply during peak usage times, thereby avoiding the more expensive electrical power. In advance of a storm or a natural disaster causing a power outage to the electrical grid, it may be desirable to have the stationary storage module maximally charged to maximize the electrical power it may supply during the power outage.

A battery charging system may be another type of RESS commonly employed within a vehicle or other mobile device. A battery charging system, for example, may be included onboard an electric vehicle to meter electrical power distribution between a battery and an electric motor, such as by controlling the battery for selectively storing electrical power for and supplying electrical power to the electric motor. The battery charging system may be operable with electrical power sources offboard the vehicle, like a stationary storage module, an electrical grid, etc. In advance of a storm or a natural disaster causing a power outage to the electrical grid, it may be desirable to also have the battery charging system maximally charged to ensure the electric vehicle may be driven during the outage and/or to maximize the electrical power it may otherwise supply during the power outage.

SUMMARY

One non-limiting aspect of the present disclosure relates to preemptively charging a rechargeable energy storage system (RESS) to mitigate the effects of a power outage during a storm, a natural disaster, or other event. The preemptive charging may be used to maximally charge the RESS in advance of the power outage and thereby maximize capabilities of the RESS to supply electrical power during the power outage.

One non-limiting aspect of the present disclosure relates to a system for preemptively charging a rechargeable energy storage system (RESS) to mitigate power outage. The system may include a weather module configured for generating a weather map of a geographical area anticipated to be impacted with a storm of a severity predicted to induce a power outage. The system may further include a power grid module configured for generating a distribution map of an electrical power distribution network within the geographical area. The distribution map may represent one or more distribution lines deployed within the geographical area to distribute electrical power to one or more dwellings having a RESS. The system may further include an outage module configured for generating an outage map by overlaying the weather map relative to the distribution map. The outage map may represent one or more intersections between the weather map and the distribution map where the power outage is predicted. The system may further include a charging module configured for preemptively charging one or more of the RESSs downstream of the intersections in advance of the power outage.

The charging module may be configured for altering arbitrage settings for one or more of the RESSs to be preemptively charged, the arbitrage settings defining parameters associated with the RESS consuming or purchasing electrical power from the power distribution network.

The charging module may be configured for altering the arbitrage settings such that the RESSs begin preemptively charging during a time period outside of a normal charging time period specified within the arbitrage settings associated therewith.

The charging module may be configured for overwriting the arbitrage settings to enable the RESSs to be preemptively charged independently of a pecuniary cost of the electrical power.

The charge module may be configured for altering the arbitrage settings by at least one of: increasing an upper state of charge (SOC) limit relative to a normal upper SOC limit for one or more of the RESSs to be preemptively charged; and lowering a lower SOC limit relative to a normal lower SOC limit for one or more of the RESSs to be preemptively charged.

The charging module, following a conclusion of the power outage, may be configured for discharging electrical power to the power distribution network from the RESSs charged above the normal upper SOC limit associated therewith.

The charge module may be configured for altering the arbitrage settings by increasing a rate of charge (ROC) limit relative to a normal ROC limit for one or more of the RESSs to be preemptively charged.

The outage module may be configured to determine when the storm passes through the geographical area, and thereafter, to reset the arbitrage settings altered in anticipation of the power outage.

The outage module may be configured to transmit notification messages to one or more individuals associated with the dwellings expected to experience the power outage, the notification messages including information for the preemptive charging to occur in advance of the power outage.

The notification messages may request the individuals to transmit a responsive message to approve or deny the preemptive charging.

A portion of the RESSs may be stationary storage modules residing at a corresponding one of the dwellings and configured for distributing stored electrical power thereto in response to the power outage.

A portion of the RESSs may be battery charging systems configured for charging a battery included onboard an electric vehicle for powering a traction motor.

The weather map may represent one or more meteorological factors associated with the storm, at least one of the meteorological factors representing wind, ice, lightning, and/or rain.

One non-limiting aspect of the present disclosure relates to a method for preemptively charging a rechargeable energy storage system (RESS) to mitigate power outage. The method may include generating a weather map of a geographical area anticipated to be impacted with a storm or a natural event having a severity predicted to induce a power outage and generating a distribution map of an electrical power distribution network within the geographical area. The distribution map may represent one or more distribution lines deployed within the geographical area to distribute electrical power to one or more dwellings having a RESS. The method may further include generating an outage map by overlaying the weather map relative to the distribution map. The outage map may represent one or more intersections between the weather map and the distribution map where the power outage is predicted. The method may further include scheduling preemptive charging of one or more of the RESSs downstream of the intersections in advance of the power outage.

The method may include overriding one or more charging restraints placed upon charging one or more of the RESSs to be preemptively charged.

The overriding may include increasing an upper state of charge (SOC) limit previously set for restraining charging of one or more of the RESSs.

The overriding may include increasing a rate of charge (ROC) limit previously set for restraining charging of one or more of the RESSs.

The overriding may include changing a time of day limit previously set for restraining charging of one or more of the RESSs.

The overriding may include removing a pecuniary limit previously set for restraining charging of one or more of the RESSs.

One non-limiting aspect of the present disclosure relates to a system for preemptively charging stationary storage modules to mitigate power outage. The system may include a weather module configured for generating a weather map of a geographical area anticipated to be impacted with a storm having a severity predicted to induce a power outage. The system may further include a power grid module configured for generating a distribution map of an electrical power grid within the geographical area. The distribution map may represent one or more distribution lines deployed within the geographical area to distribute electrical power to one or more dwellings having the stationary storage modules. The system may further include an outage module configured for generating an outage map by overlaying the weather map relative to the distribution map. The outage map may represent one or more intersections between the weather map and the distribution map where the power outage is predicted. The system may further include a charging module configured for preemptively charging one or more of the stationary storage modules in advance of the power outage. The preemptive charging may include altering arbitrage settings for one or more of the stationary storage modules to be preemptively charged. The arbitrage settings may define parameters associated with the stationary storage modules consuming electrical power from the electrical power grid.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
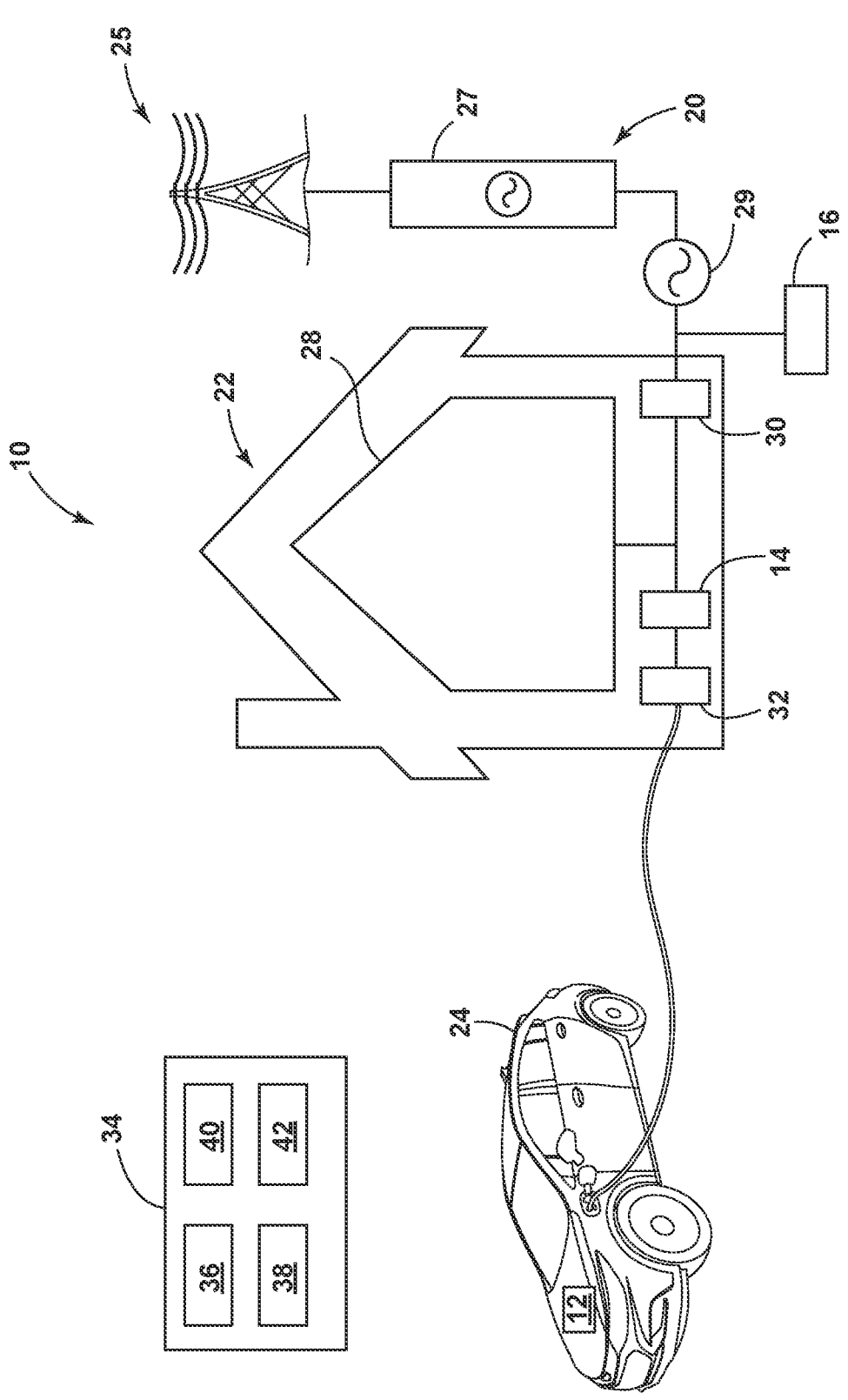
FIG. 1 illustrates a preemptive charging system configured in accordance with one non-limiting aspect of the present disclosure.

FIG. 1 illustrates a preemptive charging system 10 configured in accordance with one non-limiting aspect of the present disclosure. The system 10 may be configured for preemptively charging a plurality of rechargeable energy storage system (RESSs) 12, 14, 16 in advance of a storm, a natural disaster, or other event predicted to induce a power outage. The power outage may be associated with an inability of an electrical utility grid 20 or other electrical power distribution network to provide electrical power to a home, dwelling, building, or other location 22 having the RESSs 12, 14, 16. The capability to proactively charge the RESSs 12, 14, 16 may be beneficial in maximally charging the RESSs 12, 14, 16 in advance of the power outage so that the capabilities of the RESSs 12, 14, 16 to supply electrical power during the power outage may be maximized. The RESSs 12, 14, 16 are predominately described as corresponding with a stationary storage module 14 within the home 22 and a battery charging system 12 included within an electric vehicle 24. The present disclosure, however, fully contemplates its use and application in facilitating preemptive charging of other types of RESSs 12, 14, 16, including those that may be connected to electrical grid 20 in a different manner and/or connected to other sources of electrical power.

The exemplary illustration is believed to particularly highlight the beneficial capabilities of the present disclosure to improve electrical power distribution, management, and usage in advance of a predictable power outage when multiple RESSs 12, 14, 16 may be available for storing electrical power before and thereafter operable during a power outage to supply the prestored electrical power to each other, the electrical grid 20, and/or other devices. The stationary storage module 14 and the battery charging system 12 may be operable in this manner to facilitate storing electrical power in advance of an outage and thereafter supplying the stored electrical power, during and after the power outage, to the dwelling 22, the vehicle 24, or other the devices associated therewith, including supplying the electrical power to each other and/or back to the electric grid 20. While the present disclosure contemplates a wide variety of circuits, connections, distribution mechanisms, etc. being used to facilitate the communication of electrical power, an exemplary scenario is illustrated whereby an electrical power substation 25 may source electrical power for distribution over the electrical grid 20. The electrical grid 20 may include a plurality of interconnected transmission lines 27 to facilitate long-haul transport of electrical power to a plurality of interconnected distribution lines 29 tasked with providing a last mile connection to the destination.

The dwelling 22 may include an electrical system 28 or circuit configured for distributing electrical power therethrough. A fuse box 30 or other device may be configured to interface the electrical system 10 with the electrical grid 20. In addition to other loads, devices, equipment, etc., the electrical system 28 may be configured to facilitate interfacing the electrical grid 20 with the stationary storage module 14. The stationary storage module 14 may be configured for supplying and storing electrical power for the loads connected to the electrical system 28, which for exemplary purposes may include a charging station 32. The charging station 32 may be configured to selectively control the exchange of electrical power with the battery charging system 12. While the battery charging system 12 may be directly connected to the stationary storage module 14 or another outlet associated with electrical system 10, the use of the charging station may be beneficial in providing control and other management capabilities for regulating the supply of electric power to and/or the receipt of electric power from the battery charging system 12. The battery charging system 12 and the stationary storage module 14 may be configured individually and/or cooperatively in this manner to store electrical power provided from the electrical grid 20 or the electrical system 10, optionally with the electrical system 10 including solar or other power generation capabilities.

The system 10 may include a back-office controller 34 configured to facilitate the preemptive charging processes and operations contemplated herein. The controller 34 may include a computer-readable storage medium having a plurality of non-transitory instructions stored thereon, which when executed with an associated processor, may be operable for scheduling or otherwise controlling preemptive charging of the stationary storage module 14, the battery charging system 12, and/or the other RESSs 12, 14, 16. The controller 34 may include integrated or separate microcontrollers, software, logic, etc., which for the sake of explanation, may be referred to collectively without limitation as modules. The modules may be differentiated according to the functions associated therewith, which for non-limiting purposes may be described with respect to a weather module 36, a grid module 38, an outage module 40, and a charging module 42. The weather map module 36 may be configured for predicting when a storm or other natural disaster may disrupt the power grid 20. The grid module 38 may be configured for identifying the distribution lines, transmission lines, etc. of the electric grid 20. The outage module 40 may be configured to determine the locations, dwelling, etc., that may be affected depending on location of the outage power outage within the electrical grid 20. The charging module 42 may be configured for preemptively managing charging of the stationary storage module 14, the battery charging system 12, and/or other RESSs 12, 14, 16.

Figure 2:
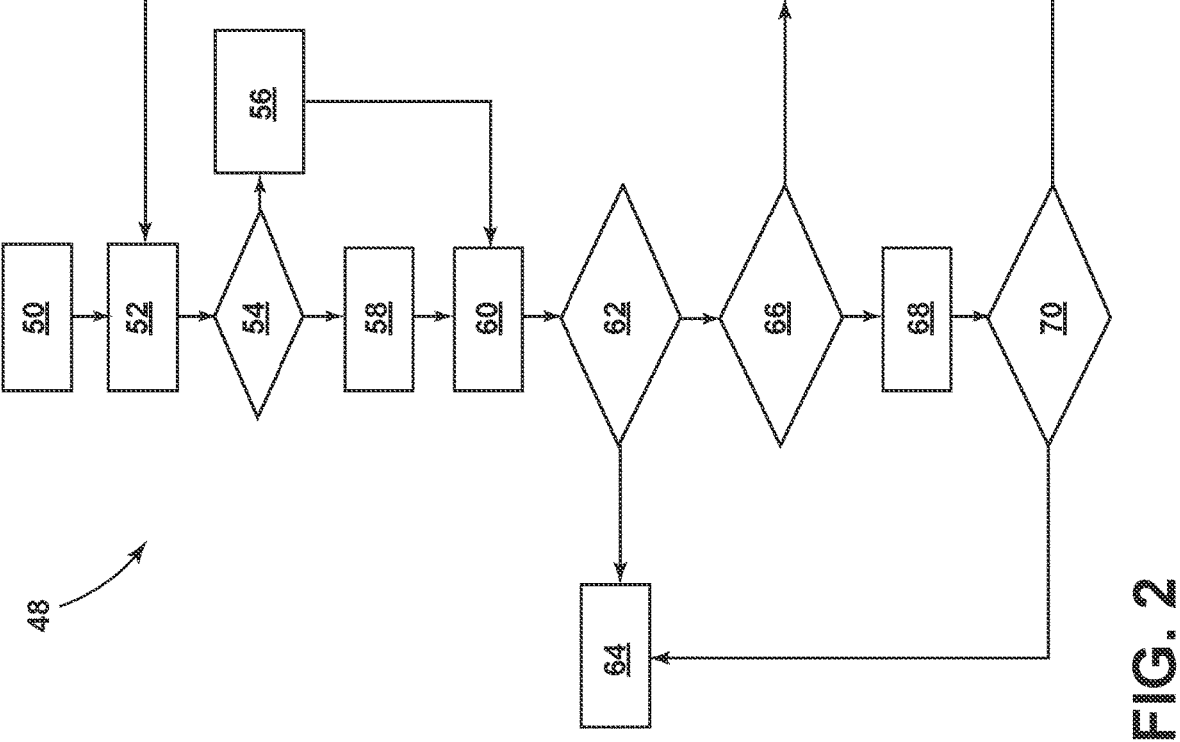
FIG. 2 illustrates a flowchart of a method for preemptively charging in accordance with one non-limiting aspect of the present disclosure.

FIG. 2 illustrates a flowchart 48 of a method for preemptively charging one or more of the electrical vehicles 24 to mitigate power outage in accordance with one non-limiting aspect of the present disclosure. Block 50 relates to determining a location for the electric vehicle 24. Block 52 relates to determining a portion of the electrical grid 20 within the vicinity of the electric vehicle 24. Block 54 relates to determining whether a severe weather alert or other warning is active nearby or approaching the vehicle 24 and/or the related portion of the electrical grid 20. Block 56 relates to the warning being inactive and determining whether any localized wind, lightning, or other influences are forecasted for the related portion electrical grid 20. Block 58 relates to the warning being active and monitoring the warning, such as to determine a severity of the weather forecast, such as meteorological factors or parameters related to wind, ice, lightning, etc. Block 60 relates to overlaying or otherwise relating the relevant portion of the electrical grid 20 with the forecasted weather event or other natural phenomena.

Block 62 relates to determining whether the weather parameters are likely to affect electrical grid 20, such as by determining whether the weather parameters are likely to be greater than a threshold, e.g., the wind gusts, expected ice, etc. being of the nature likely to cause or be predictive of a power outage. Block 64 relates to preemptively charging the vehicle 24, such as with power from the electrical grid 20, and/or a power source associated therewith, e.g., the stationary storage module 14, in advance of the predicted outage. Block 66 relates to determining whether any natural disaster warnings are active, such as for a tornado, earthquake, etc., in the event the weather parameters are unlikely to produce a power outage. Block 68 relates to overlaying the natural disaster letters relative to the related portion electrical grid 20 to determine whether the electric vehicle 24 may likely to be an area of a power outage. Block 70 relates to determining whether a natural disaster is likely to occur within the corresponding portion of the electrical grid 20, and based thereon either returning to Block 64 or Block 52.

Figure 3:
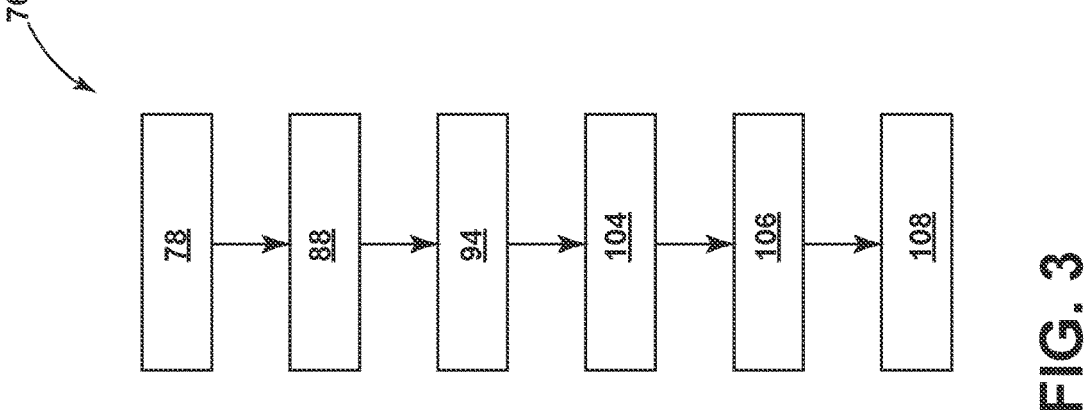
FIG. 3 illustrates a flowchart of a method for preemptively charging one or more RESSs to mitigate power outage in accordance with one non-limiting aspect of the present disclosure.

FIG. 3 illustrates a flowchart 76 of a method for preemptively charging one or more RESSs 12, 14, 16 to mitigate power outage in accordance with one non-limiting aspect of the present disclosure. The RESSs 12, 14, 16 may correspond with the exemplary illustration presented in FIG. 1 wherein the battery charging system 12 of the electric vehicle 24 may be electrically connected to the electrical system 28 associated with the stationary storage module 14. Such a scenario, for example, may occur in the event an owner of the vehicle 24 is at home before a weather event or other natural disaster is expected to arrive thereat or otherwise influence operation of the electrical grid 20 associated therewith. Block 78 relates to the weather module generating a weather map 80 of a geographical area 82 anticipated to be impacted with a storm front 84 or other natural disaster of a severity predicted to induce a power outage. Block 88 relates to the power grid 20 module generating a distribution map 90 of an electrical power distribution network within the geographical area 82, optionally with the distribution map 90 representing one or more distribution lines 27, 29 deployed within the geographical area 82 to distribute electrical power to the dwelling 22. Block 94 relates to the outage module 40 generating an outage map 96 by overlaying the weather map 80 relative to the distribution map 90.

Figure 4:
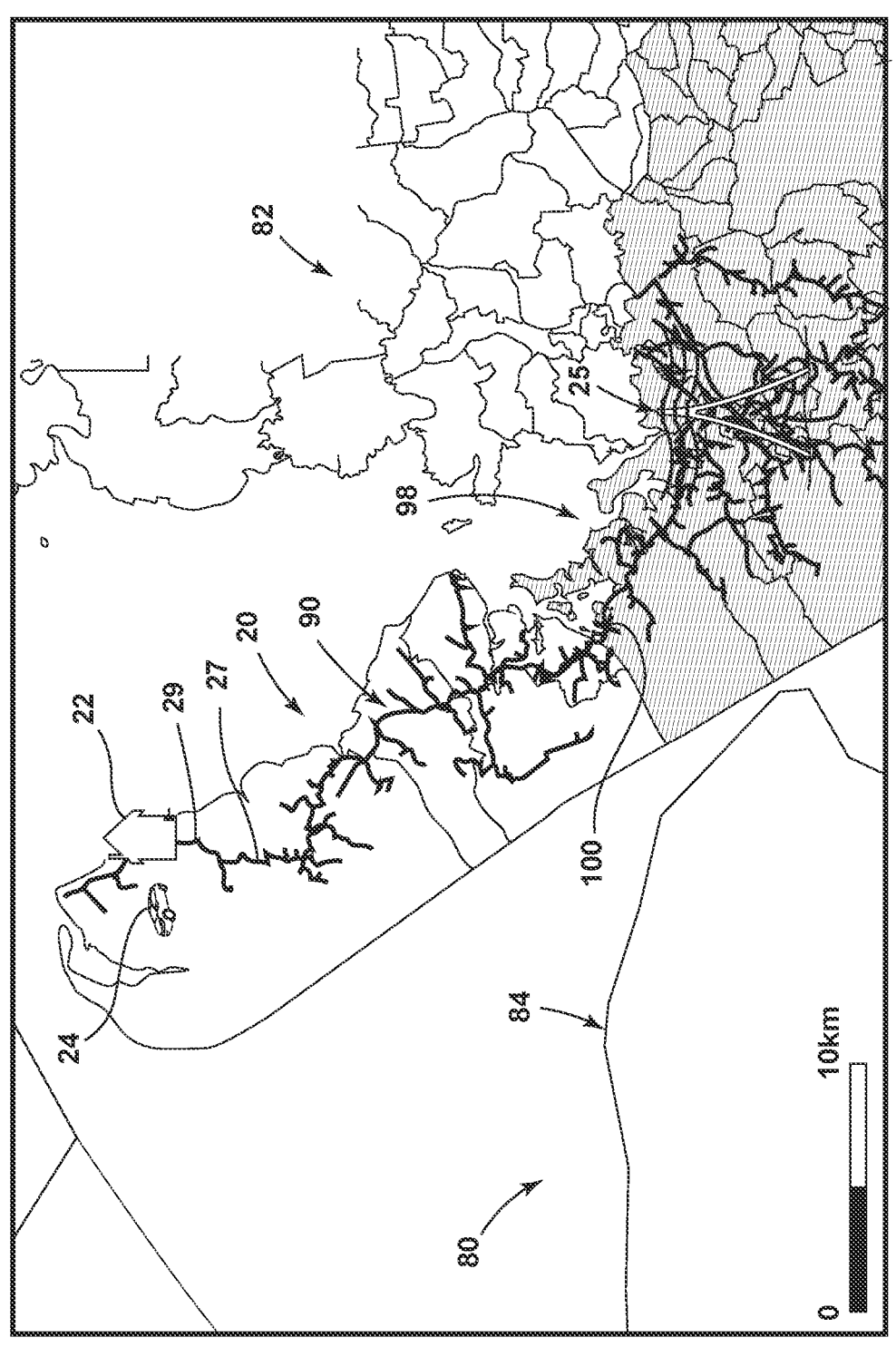
FIG. 4 illustrates a diagram of the outage map in accordance with one non-limiting aspect of the present disclosure.

FIG. 4 illustrates a diagram of the outage map 96 in accordance with one non-limiting aspect of the present disclosure. The outage map 96 may include the weather map 80 overlaid with the distribution map 90. The weather map 80 may illustrate a storm or other weather event 84 approaching the geographical area 82 associated with the vehicle 24, the dwelling 22, and the electrical substation 25. The distribution map 90 may illustrate the transmission and distribution lines 27, 29 utilized within the geographical area 82 to convey electrical power from the electrical substation 25. A highlighted portion 98 is shown to represent the intersection between the storm map 80 and the distribution map 90 where a power outage may be predicted. While various types of intersections may occur, with some intersections having more or less severity, the exemplary illustration highlights a scenario where it may be more likely that the electrical substation 25 maintains operation while one or more of the distribution lines transmission or distribution lines 27, 29 leading therefrom may be damaged such that one or more of the lines 27, 29 may be incapable of distributing electrical power downstream of a damaged location 100.

The outage map 96 is shown in a visual context whereby the weather pattern or other natural disaster 84 may be overlaid or juxtaposed to the electrical grid 20 for purposes of presenting a visual relation for the influence of the weather on the electrical grid 20. The present disclosure, however, fully contemplates other methodologies for identifying and otherwise assessing intersections between the weather event and the electrical power distribution electrical grid 20. Such intersections, for example, may be determined in a non-visual manner or in a manner independent of visual representations, such as by generating mathematical models or other data constructs capable of indicating intersections or other portions of the electrical grid 20 that may be influenced by the weather event. One such methodology may include identifying branches, forks, or other connections or nodes within the electrical grid 20 and assigning a statistical value to each. The statistical value may have a probabilistic scale sufficient to indicate a probability of the corresponding location being damaged or otherwise influenced with the weather event to an extent likely to produce an outage thereat.

Returning to FIG. 3, Block 104 relates to the controller transmitting notification messages to the battery charging system 12, the stationary storage module 14, or other RESS 16 downstream of the damage 100. The notification messages may be optionally transmitted to an operator, individual, homeowner, etc. associated with each of the affected RESSs 12, 14, 16. The notification messages may be used to convey information to the associated users of the need for preemptively charging the battery charging system 12, the stationary storage module 14, or the other RESSs 16 in advance of the expected power outage. The notification messages may request the individual in receipt thereof to approve or deny scheduling or otherwise undertaking the preemptive charging in advance of the expected power outage. A time schedule, a pecuniary cost, or other information may be provided to the individual to indicate parameters and other circumstances needed to facilitate the preemptive charging. While the present disclosure fully contemplates various ways to preemptively charge the RESSs 12, 14, 16, one type of preemptive charging may include charging the RESSs 12, 14, 16 to a maximum possible level or amount before the outage is expected to occur.

Block 106 relates the charging module to preemptively charging the battery charging system 12, the stationary storage module 14, and/or the other RESSs 12, 14, 16 determined to be downstream of the damage. One non-limiting aspect of the present disclosure contemplates the preemptive charging including operations associated with charging the RESSs 12, 14, 16 in a manner that may be outside of normal charging parameters. This may include, for example, altering arbitrage settings used to govern how the RESSs 12, 14, 16 may be charged. The arbitrage settings may define parameters associated with the RESS consuming or purchasing electrical power from the power distribution network. The charging module may be configured for altering the arbitrage settings such that the RESSs 12, 14, 16 begin preemptively charging during a time period outside of a normal charging time period specified within the arbitrage settings associated therewith, e.g., during a peak or higher cost period than the owner thereof would normally permit or has set a previous threshold to control. The charging module may be configured for overwriting the arbitrage settings to enable the RESSs 12, 14, 16 to be preemptively charged independently of a pecuniary cost of the electrical power.

One aspect of the present disclosure relates to the charge module 42 optionally being configured for altering the arbitrage settings by at least one of increasing an upper state of charge (SOC) limit relative to a normal upper SOC limit for one or more of the RESSs 12, 14, 16 to be preemptively charged and lowering a lower SOC limit relative to a normal lower SOC limit for one or more of the RESSs 12, 14, 16 to be preemptively charged. Similarly, the charge module may be configured for altering the arbitrage settings by increasing a rate of charge (ROC) limit relative to a normal ROC limit for one or more of the RESSs 12, 14, 16 to be preemptively charged. Following a conclusion of the power outage, Block 108 relates to the charging module 42 optionally being configured for discharging electrical power to the power distribution network 20 from the RESSs 12, 14, 16 charged above the normal upper SOC limit associated therewith. Likewise, the outage module 40 may be configured to determine when the storm passes through the geographical area, and thereafter, to reset the arbitrage settings altered in anticipation of the power outage i.e., to return the threshold, limits, etc. to those normally used to charge the RESSs 12, 14, 16.

As supported above, the present disclosure relates to avoiding having a low SOC in both EV and stationary storage during a power outage caused by a storm by using weather forecasts, weather alerts, and weather conditions at a utility account location, in order to estimate if a power outage is likely, whether it is due to a weather event at the individual utility location, or someplace in the distribution system that supplies the location. Knowledge of the path and size/shape of a coming weather event can be determined and overlayed onto utility mapping in order to create a listing of utility accounts that are at risk of losing power. A wide variety of RESSs may benefit, both in a vehicle, stationary supply system, or other RESS application (both residential and commercial) in those locations, and may be used to store energy for later usage. The information may also be sold to other automotive or stationary power customers for their usage. Charge SOC limits and charge rates may be overridden/optimized to obtain maximum stored energy in minimum time.

Having a fleet of fully charged RESSs in a grid that has lost power can help both the individual locations by providing power to the customer, as well as benefit the overall grid when power returns by offsetting the initial inrush to the grid as the grid is reconnected. The stored power may be used to augment power generation capability and staggering initial power draws during the first minutes/hours when demand is highest, as HVAC, refrigerators, etc. come on and try to return to normal conditions. This capability may push and backend data to top off a number of batteries, whether in a vehicle or a non-automotive application, in the event of a possible power outage due to known incoming weather events. This may use the storm/weather path, and a location's specific weather conditions, combined with mapping of electrical grids and distribution stations, to determine houses/power feeds that may be predicted to lose power due to a weather event even if the location itself may not be in the path of the weather. The capability to predict weather induced outage may be more beneficial than relying on a customer to recognize bad weather and plug in their vehicle, with the additional benefit of optionally removing SOC limitation currently enabled that are preserving battery capacity.

The present disclosure may include an Application Program Interface (API) for weather, which may be done by ingesting data into a hive computing structure on a daily basis. Once an extreme weather event is announced or has been forecasted, the impacted region/power grid may be identified by county boundaries, tracking of RESS location by electrical grid (service address/utility account), power station/substation distribution mapping in order to determine if a RESS's location will lose power due to upstream distribution damage, etc. Vehicle location may be determined either through the median of the latitude and longitude over the last 30 days via charge data gathering events or through an account/customer address on file. The shapes of a storm effect may be joined to the fleet vehicle locations, optionally with vehicles/home locations (e.g. stationary) in the intersecting shapes may be notified about the storm and the customer would be prompted to "top off" to the maximum usable SOC, or the top off may be automatic if customers have subscribed for automatic overrides.

A vehicle may start charging after customer acceptance automatically, or if the vehicle is currently unplugged, the adjusted max SOC may be communicated OTA (over the air). A stationary storage may also have any limits removed from it and scheduling normally reserved for arbitrage would be disregarded for the storm duration. One benefit of the present disclosure would be to satisfy the customer by preparing them for a power outage, e.g., topping off their HV vehicle battery SOC and station storage. This may allow the customer to power their home devices by vehicle-to-home (V2H) as well as in extreme cases to evacuate their location without being caught with limited SOC/range available. There may also be benefits to the utility grid as energy/power may be available throughout the grid to use during the outage, as well as during the re-connection of locations to the grid, to offset high initial loads. Locations that have had power during the outage may not require higher than normal power upon return of grid connection.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for preemptively charging a rechargeable energy storage system (RESS) to mitigate power outage, comprising:

a weather module configured for generating a weather map of a geographical area anticipated to be impacted with a storm of a severity predicted to possibly induce a power outage;

a power grid module configured for generating a distribution map of an electrical power distribution network within the geographical area, the distribution map representing one or more distribution lines deployed within the geographical area to distribute electrical power to one or more dwellings having a RESS;

an outage module configured for generating an outage map by overlaying the weather map relative to the distribution map, the outage map representing one or more intersections between the weather map and the distribution map where the power outage is predicted; and a charging module configured for preemptively charging one or more of the RESSs downstream of the intersections in advance of the power outage.

2. The system according to claim 1, wherein:

the charging module is configured for altering arbitrage settings for one or more of the RESSs to be preemptively charged, the arbitrage settings defining parameters associated with the RESS consuming or purchasing electrical power from the power distribution network.

3. The system according to claim 2, wherein:

the charging module is configured for altering the arbitrage settings such that the RESSs begin preemptively charging during a time period outside of a normal charging time period specified within the arbitrage settings associated therewith.

4. The system according to claim 2, wherein:

the charging module is configured for overwriting the arbitrage settings to enable the RESSs to be preemptively charged independently of a pecuniary cost of the electrical power.

5. The system according to claim 2, wherein:

the charge module is configured for altering the arbitrage settings by at least one of:

increasing an upper state of charge (SOC) limit relative to a normal upper SOC limit for one or more of the RESSs to be preemptively charged; and lowering a lower SOC limit relative to a normal lower SOC limit for one or more of the RESSs to be preemptively charged.

6. The system according to claim 5, wherein:

following a conclusion of the power outage, the charging module is configured for discharging electrical power to the power distribution network from the RESSs charged above the normal upper SOC limit associated therewith.

7. The system according to claim 5, wherein:

the charge module is configured for altering the arbitrage settings by increasing a rate of charge (ROC) limit relative to a normal ROC limit for one or more of the RESSs to be preemptively charged.

8. The system according to claim 7, wherein:

the outage module is configured to determine when the storm passes through the geographical area, and thereafter, to reset the arbitrage settings altered in anticipation of the power outage.

9. The system according to claim 8, wherein:

the outage module is configured to transmit notification messages to one or more individuals associated with the dwellings expected to experience the power outage, the notification messages including information for the preemptive charging to occur in advance of the power outage.

10. The system according to claim 9, wherein:

the notification messages request the individuals to transmit a responsive message to approve or deny the preemptive charging.

11. The system according to claim 7, wherein:

at least a portion of the RESSs are stationary storage modules, the stationary storage modules residing at a corresponding one of the dwellings and configured for distributing stored electrical power thereto in response to the power outage.

12. The system according to claim 7, wherein:

at least a portion of the RESSs are battery charging systems, the battery charging systems configured for charging a battery included onboard an electric vehicle for powering a traction motor.

13. The system according to claim 1, wherein:

the weather map represents one or more meteorological factors associated with the storm, at least one of the meteorological factors representing wind, ice, lightning, and/or rain.

14. A method for preemptively charging a rechargeable energy storage system (RESS) to mitigate power outage, comprising:

generating a weather map of a geographical area anticipated to be impacted with a storm or a natural event having a severity predicted to possibly induce a power outage;

generating a distribution map of an electrical power distribution network within the geographical area, the distribution map representing one or more distribution lines deployed within the geographical area to distribute electrical power to one or more dwellings having a RESS;

generating an outage map by overlaying the weather map relative to the distribution map, the outage map representing one or more intersections between the weather map and the distribution map where the power outage is predicted; and scheduling preemptive charging of one or more of the RESSs downstream of the intersections in advance of the power outage.

15. The method according to claim 14, further comprising:

overriding one or more charging restraints placed upon charging one or more of the RESSs to be preemptively charged.

16. The method according to claim 15, wherein:

the overriding includes increasing an upper state of charge (SOC) limit previously set for restraining charging of one or more of the RESSs.

17. The method according to claim 16, wherein:

the overriding includes increasing a rate of charge (ROC) limit previously set for restraining charging of one or more of the RESSs.

18. The method according to claim 17, wherein:

the overriding includes changing a time of day limit previously set for restraining charging of one or more of the RESSs.

19. The method according to claim 18, wherein:

the overriding includes removing a pecuniary limit previously set for restraining charging of one or more of the RESSs.

20. A system for preemptively charging stationary storage modules to mitigate power outage, comprising:

a weather module configured for generating a weather map of a geographical area anticipated to be impacted with a storm having a severity predicted to possibly induce a power outage;

a power grid module configured for generating a distribution map of an electrical power grid within the geographical area, the distribution map representing one or more distribution lines deployed within the geographical area to distribute electrical power to one or more dwellings having the stationary storage modules;

an outage module configured for generating an outage map by overlaying the weather map relative to the distribution map, the outage map representing one or more intersections between the weather map and the distribution map where the power outage is predicted; and

a charging module configured for preemptively charging one or more of the stationary storage modules in advance of the power outage, wherein the preemptive charging includes altering arbitrage settings for one or more of the stationary storage modules to be preemptively charged, the arbitrage settings defining parameters associated with the stationary storage modules consuming electrical power from the electrical power grid.

* * * * *